United States Patent
Gudesen et al.

Patent Number: 6,084,850
Date of Patent: Jul. 4, 2000

[54] METHOD FOR OPTICAL DATA STORAGE AND OPTICAL DATA STORAGE MEDIA

[75] Inventors: Hans Gude Gudesen, Gamle Fredrikstad; Rolv Møll Nilsen, Moss; Thormod Næringsrud, Slitu, all of Norway

[73] Assignee: Thin Film Electronics ASA, Oslo, Norway

[21] Appl. No.: 08/973,070

[22] PCT Filed: Jun. 24, 1996

[86] PCT No.: PCT/NO96/00156

§ 371 Date: Jan. 28, 1998

§ 102(e) Date: Jan. 28, 1998

[87] PCT Pub. No.: WO97/01166

PCT Pub. Date: Jan. 9, 1997

[30] Foreign Application Priority Data

Jun. 23, 1995 [NO] Norway ................................. 952541

[51] Int. Cl.[7] ...................................................... G11B 7/24
[52] U.S. Cl. ............................ 369/275.1; 369/14; 369/94
[58] Field of Search ............................ 369/275.3, 275.1, 369/14, 15, 94, 281, 283, 286

[56] References Cited

U.S. PATENT DOCUMENTS

| | | |
|---|---|---|
| 3,731,060 | 5/1973 | Weinstein . |
| 3,800,942 | 4/1974 | Hirata et al. . |
| 5,317,556 | 5/1994 | Tsuboi et al. ............................ 369/112 |
| 5,371,730 | 12/1994 | Maeda et al. ............................ 369/291 |
| 5,825,404 | 10/1998 | Konno et al. ............................ 347/262 |

FOREIGN PATENT DOCUMENTS

| | | |
|---|---|---|
| 0293495 | 12/1987 | European Pat. Off. . |
| 1184567 | 4/1968 | United Kingdom . |
| WO88/03694 | 11/1986 | WIPO . |
| WO93/12529 | 7/1993 | WIPO . |

OTHER PUBLICATIONS

JP-A-56-129989, Patent Abstracts of Japan, vol. 6, No. 5, P-97, IKEHARA.

*Primary Examiner*—Tan Dinh
*Attorney, Agent, or Firm*—McAulay Nissen Goldberg & Kiel, LLP

[57] ABSTRACT

In a method for optical data storage with high density, there are employed as the data carrying medium a number of flat, thin memory components in the form of cards or discs. Two or more of the memory components are arranged in a stack, thus enabling each individual memory component to be manoeuvred in relation to the other memory components by means of a manoeuvring device, and a given memory component is moved in relation to the other memory components in the stack in order to write or read data in a data carrying area on the memory component, which can be addressed optically during the write or read operation without interference from the other memory components. A data carrying medium for use with the method for optical data storage with high density comprises a number of flat, thin memory components in the form of cards or disks. A memory component comprises one or more data carrying areas, each data carrying area being capable of including one or more information carrying layers and arranged for optical storage of data. Furthermore, outside the data carrying area(s) the memory component comprises one or more optically transparent areas or windows.

21 Claims, 2 Drawing Sheets

METHOD FOR OPTICAL DATA STORAGE AND OPTICAL DATA STORAGE MEDIA

BACKGROUND OF THE INVENTION

1. Field of the Invention

The invention concerns a method for optical data storage with high density, wherein there are employed as a data carrying medium a number of flat thin memory components in the form of cards or disks, wherein each component comprises one or more information carrying layers, wherein each memory component has one or more data carrying areas which are including one or more of the information carrying layers and adapted for optical data storage, and wherein the method comprises arranging two or more of the memory components in a stack, thus enabling each individual memory component to be maneuvered in relation to the other memory components by means of a maneuvering device. The invention also concerns a data carrying medium for use with the method for optical data storage with high density, wherein the data carrying medium comprises a number of flat, thin memory components in the form of cards or disks, wherein each memory component comprises one or more information carrying layers, and wherein each memory component comprises one or more data carrying areas which are including one or more of the information carrying layers and being adapted for optical storage of data.

2. Description of the Prior Art

In to-day's digital, optical data storage media information is stored in a flat layer on a disk, a card or tape. Circular disks or a rectangular card format are normally used. Even though the data density per area unit in the storage layer is very high, the effective volumetric storage density is not correspondingly high. Each disk or each card has only one or two data storage layers at the most and is typically 0.7–2 mm thick in order to provide the necessary rigidity and flatness for write/read operations. Moreover, when such media are placed in a protective cassette, there is a further increase in the volume. Even in the case of so-called "floppy" optical Bernoulli disks which have recently been proposed, the volumetric density is limited by the still substantial volume of the actual floppy disk's substrate, as well as the requirement for a protective housing or sleeve to cover the disk. The limiting effect of the packing on the volumetric density in connection with filing is particularly obvious in libraries which store CD cassettes.

The information carrying layer on present optical data storage media is thin, typically much less than 1 $\mu$m. Thus only a small fraction of the volume of the disk or card is used directly for the data storage process. This is also the case even if the protective housing or sleeve is disregarded.

If it were possible to use the entire volume in a typical disk or a card for optical data storage, with a density which corresponded to that which at present can be achieved per area unit, this would be of substantial importance. By extrapolating from an area density which for example corresponds to a bit spacing of 1 $\mu$m, the volumetric density could be $10^9$ bit/mm$^3$. In a number of countries considerable efforts have been made to achieve digital, optical data storage within the volume of a data medium. A number of different methods have been proposed for this purpose:

(a) Holographic methods, in which refraction index changes are coded and read in the bulk material;

(b) three-dimensional positioning of bit points in a volume-filling pattern within a bulk material, selective positioning being, achieved by means of sharp focusing of a laser beam, a non-linear response in the medium or an excitation on several wavelengths, (c) stacking of a number of flat information carrying layers close to one another in a uniform structure which may be a simple bulk material or a number of thin substrates which are attached to one another in order to form a sandwich structure.

Of these above-mentioned methods, (a) and (b) appear to have the potential for the highest volumetric data density, but at the present time they are far from being capable of practical implementation, not least in equipment which should not be too expensive. In connection with the method described under (c), several different techniques are the subject of research and development, cf. the examples mentioned in the following. Even though these techniques appear to have the potential to increase data capacity on each disk or card up to tenfold, they all suffer from the drawback that the carrying substrate has to be manufactured within very strict optical and mechanical tolerances. In addition to the fact that this males for increased costs, there will also be a good chance that the individual component will be of a substantial thickness. The following examples of the state of the art and development trends will now be briefly discussed.

(1) A sharply focused laser beam with small depth of field can address a number of information carrying layers at different depths under the surface of a disk or a card by moving the focal point along the laser beam's axis, by analogy with confocal microscopy. At each depth level a thin optical storage layer must be provided in the disk's bulk material, e.g. by forming a dedicated plane structure. The absorbing, reflecting and transmitting properties for each layer must be carefully adapted and controlled in order to avoid crosstalk and covering up the deeper-lying layers. At present it is not clear to what extent these requirements limit the number of layers which can be used in practice. It appears to be obvious that the very stringent requirements regarding the flatness and optical quality of the disk or card cancel out some of the benefits which are obtained with a monolithic structure.

(2) IBM recently presented a solution which resembles that which is described in the above example, but with a composite disk consisting of a number of thin disks which are joined together to form a sandwich structure, and each of which is equipped with an information carrying layer. Once again the optical properties of each layer must be carefully matched in order to avoid crosstalk and covering up. According to IBM it should be possible to stack up to ten layers in this manner. However, the composite disk is relatively thick and does not appear to be well adapted to the market requirements for inexpensive data carriers in a compact and practical format.

Finally it may as further examples of prior art be referred to that from GB patent No. 1 184 657 there is known a data storage medium with a number of photographic data storage elements in form of planar photographic transparencies which are displaced to selected positions for addressing and from EP-A1-0 293 495 an optical memory device with optical data carriers, for instance in form of cylinders which are guided in a container with an optical transparent window and therein can be displaced in translation and rotation for addressing from an optical write/read device.

Further there is from U.S. Pat. No. 3,800,942 known an information retrieval device comprising a multiplicity of jackets each for containing an information card carrying picture information, a plurality of magazines each for containing a plurality of such jackets, a drum for supporting a plurality of such magazines in juxtaposition and a means for transporting the magazines on the drum at random to a selector means for thereby to retrieve a desired information card from a desired magazine transported to the selector means. The device is mechanically complicated, as each magazine must be transported to the selector means before the information card can be retrieved.

As further examples of prior art there may be referred to that from GB patent No. 1,184,657 there is known a data storage medium with a number of photographic data storage elements in form of planar photographic transparencies which are displaced to selected positions for addressing and from EP-A1-0 293 495 an optical memory device with optical data carriers, for instance in form of cylinders which are guided in a container with an optical transparent window and therein can be displaced in translation and rotation for addressing from an optical write/read device.

Finally, it should also be mentioned that players for playback of a gramophone records and CD records may be equipped with facilities for automatic record changing. This is usually done by arranging the records in a stack-like configuration and extracting a record from the stack-like configuration for playback. The stack-like configuration may be contained in a magazine, as is the case in juke boxes and some CD players. However, in order to be manoeuvred and transported to the playback device, the records in the stack are physically separated and magazines for playback devices of this kind tend to be quite voluminous. However, International Published Patent application WO88/03694 discloses a record player for CD records stacked in a magazine and wherein a record is only partially extracted from the magazine in order to engage with drive mechanism for playback. The same principle could easily well be applicable in a CD ROM player with a magazine for CD ROMs. The drive and read means will in any case be located outside the magazine as the record must be freely rotated in the reading operation.

Further it should also be mentioned that players for playback of a gramophone records and CD records may be equipped with facilities for automatic record changing. This is usually done by arranging the records in a stack-like configuration and extracting a record from the stack-like configuration for playback. The stack-like configuration may be contained in a magazine, as is the case in juke boxes and some CD players. However, in order to be maneuvered and transported to the playback device, the records in the stack are physically separated and magazines for playback devices of this kind tend to be quite voluminous. However, International Published Patent application WO88/03694 discloses a record player for CD records stacked in a magazine and wherein a record is only partially extracted from the magazine in order to engage with drive mechanism for playback. The same principle could easily well be applicable in a CD ROM player with a magazine for CD ROMs. The drive and read means will in any case be located outside the magazine as the record must be freely rotated in the reading operation.

BRIEF SUMMARY OF THE INVENTION

The object of the present invention is therefore to provide a method which can be used in optical data storage with high density and use and especially in a form of volumetric storage. Another object of the invention is to provide a data carrying medium which can be used with the method in order to permit a satisfactorily high, volumetric storage density.

A further object of the invention is that a method and data carrying medium of this kind should meet a requirement for cost-effective data storage systems implemented in a compact and user-friendly format.

The above-mentioned and other objects are achieved with a method according to the invention which is characterized by providing one or more optically transparent areas or windows on each memory component, thus forming a window area in the stack, each window being arranged and designed in such a manner that the windows are aligned with one another when the memory component is arranged in the stack, displacing a given memory component in relation to the other memory components in the stack in translation or rotation, such that a data carrying area on the given memory component is aligned with the window area in the stack and without the displacement causing the memory component to be separated from the stack, whereby one or more of the data carrying areas on the displaced memory component wholly or partly can be exposed for reading or writing by means of the maneuvering device in order to write or read data in the data carrying area or areas, the memory component in the write or read operation being addressed optically without interference from the other memory components in the stack.

A data carrying medium according to the invention is characterized in that the memory component outside the data carrying area or areas comprises one or more optically transparent areas or windows, the window having a geometric shape corresponding to the shape of data carrying area.

In a preferred embodiment of the data carrying medium two or more memory components are arranged in a stack and each memory component is adapted to be maneuvered in relation to the other memory components by a manoeuvring device.

Further advantageous embodiments of the invention are disclosed in the dependent claims. The invention will now be explained in more detail in connection with exemplary embodiments and the attached drawing.

DETAILED DESCRIPTION OF THE INVENTION

Figure 1A:
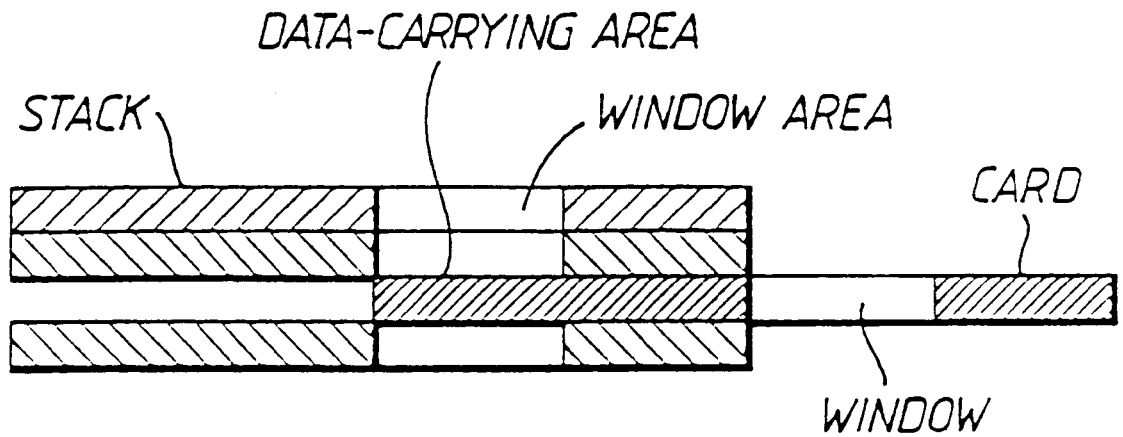
FIGS. 1a, b illustrates a first embodiment of the method and the data carrying medium according to the invention.
Figure 1B:
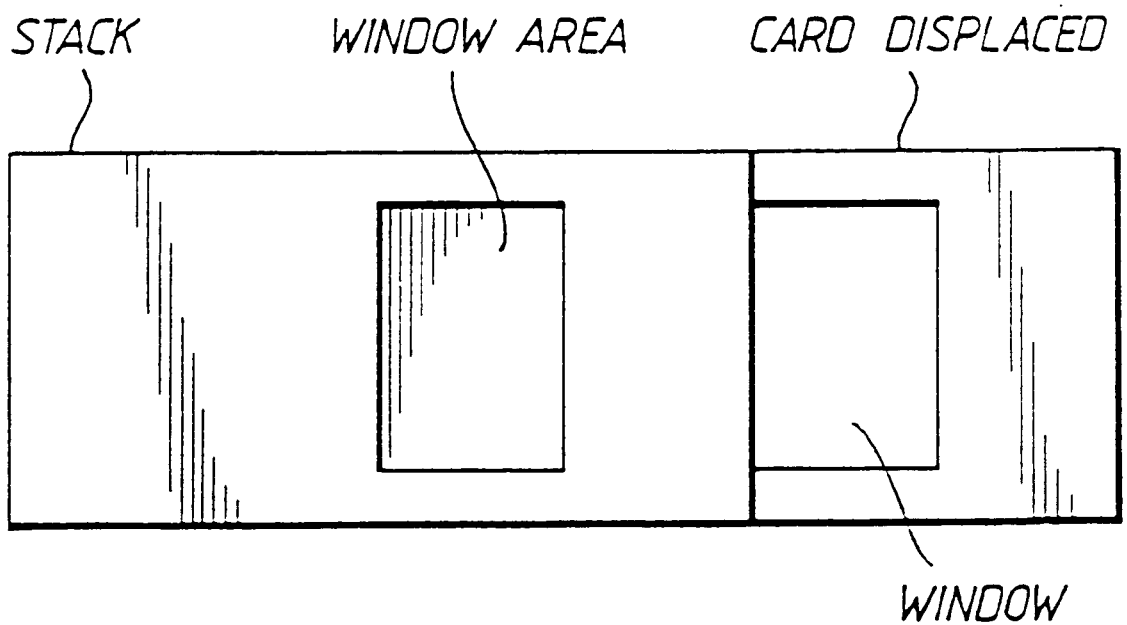

In FIGS. 1a, b a first embodiment of the invention is illustrated in which the stack of card-shaped memory components or cards is seen in cross section in FIG. 1a and from above in FIG. 1b.

Further FIGS. 1a, b show how a memory component for a write/read operation is extracted only partially from the stack, thus exposing at least a data carrying area on the card for writing/reading and without separating the card physically from the stack. The card-shaped memory component, referred to only as the card in the following, which comprises one or more not shown data carrying areas, can now, for example, be identified by means of one or more optically readable identification marks provided on the card, whereupon a not shown write/read device is employed to write or read data in the data carrying area(s) on the card.

Subsequently, as shown in FIG. 1b, the card is returned to its original position in the stack.

It should be understood that each card or each memory component in the stack contains at the most one or only a few information carrying layers, but as opposed to the above-mentioned prior art, the cards in the stack according, to the method in the invention are naturally not immovable in relation to one another. It will be seen that during the write/read operation a given card can be addressed optically without any interference whatever from the other cards in the stack.

As shown in FIGS. 1a and 1b there are in each card provided one or more optically transparent areas or windows which substantially correspond in shape and extent to a data carrying area on the card. When the cards are arranged in a stack, these windows in each card are aligned with one another, thus forming a window area in the stack. By now moving a given card in the stack, a data area on this card can be placed in the window area in the stack and optically read without interference from the other cards in the stack, through the window area in the stack by means of a write/read device located outside the stack. Thus the card does not need to be extracted from the stack, but is after a write/read cycle pushed into the stack, whereupon the write/read operation with extraction of a second card can be repeated. The windows in each individual card can be made of an optically transparent material, but they can also simply be a through in the going opening card. Several such windows can naturally be provided in each card, e.g. alternating with data carrying areas and in such a manner that several data carrying areas can be written or read simultaneously through respective corresponding window areas, a number of write/read devices being, employed which thus corresponds to the number of window areas in the stack.

Figure 2A:
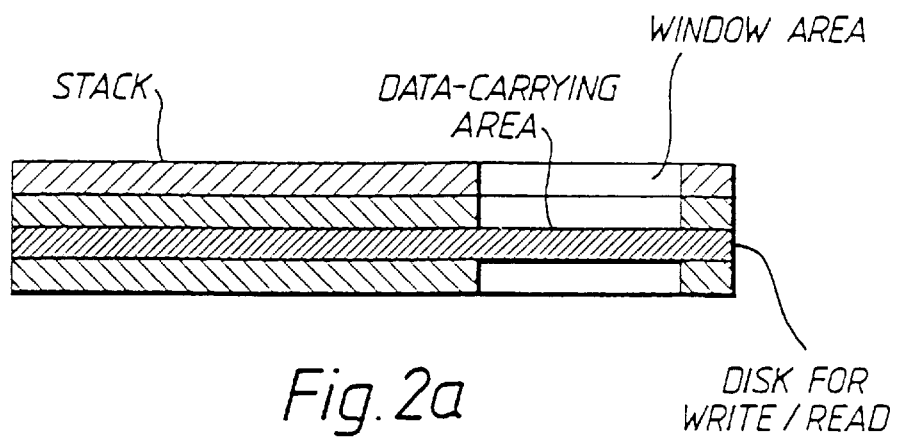
FIGS. 2a, b illustrates a second embodiment of the method and the data carrying medium according to the invention.
Figure 2B:
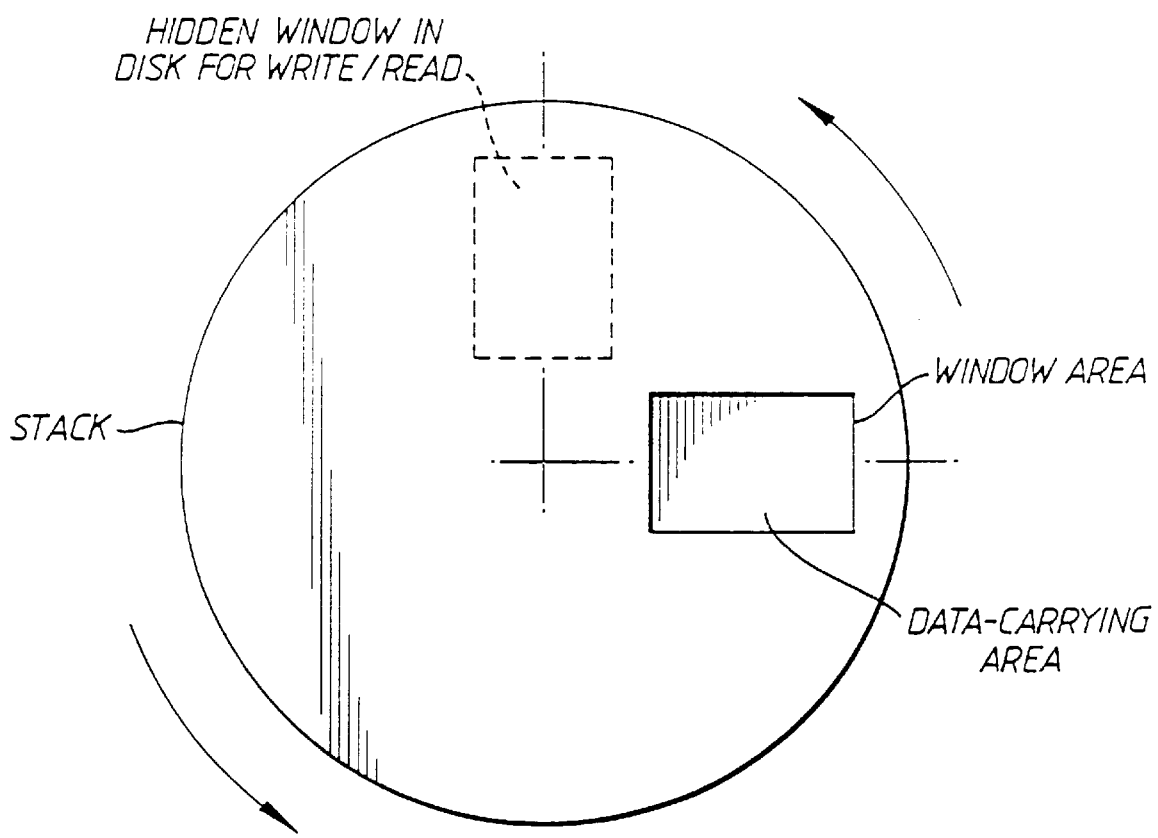

The use of a data carrying medium with memory components with optically transparent areas or windows can easily be adapted to a method where the movement of the memory component in relation to the other memory components in the stack is not performed by translation, but rather by rotation. In this case the memory component may preferably be designed as an optical disk and the appearance of the stack is as illustrated from the side in FIG. 2a and in a plan view in FIG. 2b. The memory components in a circular, disk-shaped stack are again arranged in such a manner that the windows in the individual disks are in alignment with one another and form a window area in the stack. By rotating a disk in the stack independently of the other disks, a data carrying area on the former can be placed in the stack's window area and written or read therethrough by an optical write/read device and without interference from the other disks in the stack. Here too several windows can be provided in each disk, thus enabling the write/read operation to be undertaken by performing a sector movement of the disk, e.g. over 90' in the case of four windows in the disk. Alternatively a number of windows can also here be used in each disk, providing alternating windows and data carrying areas and allowing reading to be carried out when the disk has performed an angular movement which locates the respective data area in alignment with corresponding window areas in the stack. Simultaneous writing/reading can thus be undertaken since separate write/read devices are provided in a number which corresponds to the number of window areas in the stack.

For the sake of simplicity the stacks are illustrated in all the figures with only four memory components. However, a much higher number of memory components can be stacked, the number depending on the depth of field of the optical write/read device and how complex it is, but also on the parameters for the actual information carrying layer. The mechanical properties of the memory components, such as rigidity, friction and adhesive properties will also be capable of affecting the optimal number of memory components in a stack and similarly the choice of strategies for manoeuvring, moving and extraction of the memory components and the mechanical solutions employed for this purpose. In this connection it should be understood that the not shown manoeuvring device which is not a part of the invention may well be in the form of a per se known mechanical gripping or translation mechanism, but may also make use of electromechanical, pneunomechanical or electropneumatic design solutions. Finally the number of memory components in a stack will also be conditional on the desired random access time and write/read speeds.

For reading data from the data carrying area(s) there can be provided on the surface of the memory component optically active structures, whose configuration is substantially conformal with the data carrying areas and which moreover permit, e.g., the use of wavelength or angle-tunable methods for reading data from the information carrying layer, these being preferably arranged in layers between the optically active structure and an underlying substrate. A data carrying area can thereby consist of several information carrying layers provided at different depths in the memory component. In this connection the optically active structures can be based on the use of refractive elements in the form of microspheres, as these are described in International Published Patent Application WO 91/11804. In the present method and the present data carrying medium the use of microsphere-based optical structures (lenses) in connection with optical data storage would appear to be well suited, since it permits a high area density for the storage and permits great depth of field, thus enabling thin and flexible substrates to be used, while at the same time it is possible to achieve low friction and little tendency to sticking. It should also be noted that the memory components, i.e. the disks or the cards, should be thin in order to provide the desired high volumetric storage density.

What is claimed is:

1. A data carrying medium for use with a method for optical data storage with high density, comprising:

a number of flat, thin memory components in the form of cards or disks which form a stack of memory components;

each said memory component comprising at least one information carrying layer;

each said memory component comprising at least one data carrying area, each said data carrying area including at least one said information carrying layer for optical storage of data;

the memory component outside each said data carrying area comprising at least one optically transparent area;

each said transparent area having a geometric shape corresponding to a shape of a data carrying area; and each said memory component in the stack of memory components being alignable with each other to form a window area and being displaceable relative to other memory components to permit reading and writing through said window area when said optically transparent area of said memory components are aligned with each other without separating physically each said memory component from said other memory components.

2. The data medium according to claim 1, wherein at least two of said memory components are arranged in the stack, and each said memory component is manoeuvreable in relation to other of said memory components by manoeuvring means.

3. The data carrying medium according to claim 1, including an optically active structure on the surface of the memory component at, at least one of each said data carrying area, said optically active structure forming a configuration which is substantially conformed with each said data carrying area.

4. The data carrying medium according to claim 3, wherein each said data carrying area comprises at least one of the information carrying layers arranged in layers between the optically active structure and an underlying substrate.

5. The data carrying medium according to claim 1, wherein the memory component is a rectangular card.

6. The data carrying medium according to claim 1, wherein the memory component is a circular disk.

7. The data carrying medium according to claim 1, wherein the memory component is provided with at least one optically readable, unique identification mark.

8. A method for optical data storage with high density, wherein there are employed as a data carrying medium a number of flat thin memory components, wherein said memory component comprises at least one information carrying layer and comprises at least one data carrying area which includes at least one said information carrying layer and is adapted for optical data storage comprising the step of:
arranging at least two said memory components in a stack, for enabling each said individual memory component to be manoeuvered in relation to other of said memory components by a manoeuvering device;
forming a window area in the stack by providing at least one of an optically transparent area on each said memory component, each said at least one of said transparent area being arranged and designed in a manner that the transparent areas are aligned with one another and together forming the window area in the stack when the memory component is arranged in the stack;
displacing a given memory component in relation to other of said memory components in the stack in at least one of translation and rotation such that a data carrying area on the given memory component is aligned with the window area in the stack, and without the displacement causing the memory component to be separated from the stack, whereby at least one of the data carrying areas wholly or partly is exposed for reading or writing by the manoeuvering device in order to write or read data in the at least one of the data carrying areas; and
optically addressing the memory component in the write or read operation without interference from the other memory components in the stack.

9. The method according to claim 8, including displacing the memory component after the write/read operation back to its original position in the stack.

10. The method according to claim 8, including performing the displacing of the given memory component by means of a rotary movement independently of the other memory components in the stack, the memory components and the stack, together with the said at least one of said window and said transparent area and data carrying areas provided in the memory components being adapted for the rotary movement.

11. The data carrying medium according to claim 3, wherein the memory component is a rectangular card.

12. A data carrying medium for use with a method for optical data storage with high density, comprising:
a number of flat, thin memory components in the form of cards or disks which form a stack of memory components;
each said memory component comprising at least one information carrying layer;
each said memory component comprising at least one data carrying area, each said data carrying area including at least one said information carrying layer for optical storage of data;
the memory component outside each said data carrying area comprising at least one window;
each said window having a geometric shape corresponding to a shape of a data carrying area; and
each said memory component in the stack of memory components being alignable with each other to form a window area and being displaceable relative to other memory components to permit reading and writing through said window area when said window of said other memory components are aligned with each other without physically separating each said memory component from said other memory components.

13. The data medium according to claim 12, wherein at least two of said memory components are arranged in the stack, and each said memory component is manoeuvreable in relation to other of said memory components by manoeuvring means.

14. The data carrying medium according to claim 12, including an optically active structure on the surface of the memory component at, at least one of each said data carrying area, said optically active structure forming a configuration which is substantially conformed with each said data carrying area.

15. The data carrying medium according to claim 12, wherein each said data carrying area comprises at least one of the information carrying layers arranged in layers between the optically active structure and an underlying substrate.

16. The data carrying medium according to claim 12, wherein the memory component is a rectangular card.

17. The data carrying medium according to claim 12, wherein the memory component is a circular disk.

18. The data carrying medium according to claim 13, wherein the memory component is provided with at least one optically readable, unique identification mark.

19. A method for optical data storage with high density, wherein there are employed as a data carrying medium a number of flat thin memory components, wherein said memory component comprises at least one information carrying layer and comprises at least one data carrying area which includes at least one said information carrying layer and is adapted for optical data storage comprising the step of:
arranging at least two said memory components in a stack, for enabling each said individual memory component to be manoeuvered in relation to other of said memory components by a manoeuvering device;
forming a window area in the stack by providing at least one window on each said memory component, each said at least one window being arranged and designed in a manner that the windows are aligned with one another when the memory component is arranged in the stack;
displacing a given memory component in relation to other of said memory components in the stack in at least one of translation and rotation such that a data carrying area on the given memory component is aligned with said window area in the stack, and without the displacement causing the memory component to be separated from the stack, whereby at least one of the data carrying areas wholly or partly is exposed for reading or writing by the manoeuvering device in order to write or read data in the at least one of the data carrying areas; and optically addressing the memory component in the write or read operation without interference from the other memory components in the stack.

20. The method according to claim 19, including performing the displacing of the given memory component by means of a rotary movement independently of the other memory components in the stack, the memory components and the stack, together with the windows and data carrying areas provided in the memory components being adapted for the rotary movement.

21. The method according to claim 19, including displacing the memory component after the write/read operation back to its original position in the stack.

* * * * *